US008792194B2

(12) United States Patent
Sakai et al.

(10) Patent No.: US 8,792,194 B2
(45) Date of Patent: Jul. 29, 2014

(54) RECORDING REPRODUCING APPARATUS AND MAGNETIC RECORDING MEDIUM

(75) Inventors: Toshihiko Sakai, Osaka (JP); Yoshiteru Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 132 days.

(21) Appl. No.: 13/446,755

(22) Filed: Apr. 13, 2012

(65) Prior Publication Data

US 2012/0275048 A1 Nov. 1, 2012

(30) Foreign Application Priority Data

Apr. 26, 2011 (JP) ................................. 2011-098315

(51) Int. Cl.
*G11B 5/02* (2006.01)
*G11B 27/36* (2006.01)

(52) U.S. Cl.
USPC ............................................... 360/31; 360/39

(58) Field of Classification Search
CPC .. G11B 5/012; G11B 2005/0005; G11B 5/09; G11B 2220/2516
See application file for complete search history.

(56) References Cited

U.S. PATENT DOCUMENTS 5,057,950 A * 10/1991 Ozaki et al. .................. 360/72.2
5,184,263 A * 2/1993 Fukakusa et al. ............... 360/75
5,287,229 A * 2/1994 Saito et al. ...................... 360/60
8,482,874 B2 * 7/2013 Tinker ............................. 360/55
2005/0179967 A1 * 8/2005 Ogasawara ..................... 359/24
2006/0232874 A1 * 10/2006 Tsuchinaga et al. ............ 360/75
2007/0030588 A1 * 2/2007 Tsuchinaga et al. ....... 360/77.08
2008/0158718 A1 * 7/2008 Kobayashi et al. ........ 360/77.08
2009/0190251 A1 7/2009 Yokohata et al.
2010/0033865 A1 * 2/2010 Hashimoto et al. ............. 360/59
2010/0202269 A1 * 8/2010 Lee et al. ....................... 369/103
2010/0277827 A1 * 11/2010 Wood et al. ..................... 360/75
2011/0090583 A1 4/2011 Mutoh
2011/0119498 A1 * 5/2011 Guyot ........................... 713/189
2011/0242707 A1 * 10/2011 Yoon et al. ................. 360/294.1
2012/0057255 A1 * 3/2012 Kishie et al. .................... 360/31
2012/0162806 A1 * 6/2012 Champion et al. .............. 360/53
2012/0275048 A1 * 11/2012 Sakai et al. ...................... 360/31
2013/0057977 A1 * 3/2013 Sakai et al. ...................... 360/75
2013/0057978 A1 * 3/2013 Sakai et al. ...................... 360/75
2013/0148225 A1 * 6/2013 Coker et al. .................... 360/31

FOREIGN PATENT DOCUMENTS

JP 2009-181616 8/2009
JP 2011-008881 1/2011

* cited by examiner

*Primary Examiner* — Peter Vincent Agustin
(74) *Attorney, Agent, or Firm* — Edwards Wildman Palmer LLP; David G. Conlin; Steven M. Jensen

(57) ABSTRACT

A magnetic recording element records information by applying a recording magnetic field to a magnetic recording medium having an information recording area to form a plurality of recording columns extending in a first direction. Recording by the magnetic recording element is performed so that a first recording column and a second recording column formed before the first recording column partially overlap each other in a second direction perpendicular to the first direction, and that a recording start position of the first recording column is positioned upstream, relative to the recording direction, of a recording start position of the second recording column.

16 Claims, 17 Drawing Sheets

RECORDING REPRODUCING APPARATUS AND MAGNETIC RECORDING MEDIUM

The present application claims priority from Japanese Patent Application No. 2011-98315, which was filed on Apr. 26, 2011, the disclosure of which is herein incorporated by reference in its entirety.

BACKGROUND OF THE INVENTION

1 Field of the Invention

The present invention relates to a magnetic recording reproducing apparatus capable of densely recording information as in Shingle recording method and a magnetic recording medium for use in such an apparatus.

2 Description of the Related Art

Improvement in high quality pictures and images causes a considerable increase in the volume of information handled by a user. For the purpose of realizing a larger capacity magnetic recording apparatus so-called HDD (Hard Disk Drive), approaches for increasing the surface recording density have been discussed. One high-density magnetic recording technology that seems to be promising is a Shingle recording, method which is disclosed in Japanese Unexamined Patent Publication No. 2011-8881 (Tokukai 2011-8881) for example, in which recording is performed so that a recording column currently being recorded partially overlap with another recording column adjacent in a track width direction, the other recording column having been subjected to immediately previous recording.

In general, the pitch of tracks formed on a magnetic recording medium is a several times greater than a shortest mark formed. However, Shingle recording method performs recording so as to partially overlap with an adjacent recording column having been subjected to immediately previous recording. Therefore, the pitch of tracks to be formed at the end is reduced to a pitch which is approximately the same as the shortest mark length. In other words, recording is performed so as to partially overwrite the adjacent recording column having been subjected to immediately previous recording. This increases the number of tracks per unit length to several times more, and makes it possible a significant improvement in the recording density.

SUMMARY OF THE INVENTION

However, in the apparatus disclosed in the above publication, a recording start position relative to the circumferential direction is the same in each recording column. Therefore, due to external disturbance or the like, if the recording start position is slightly shifted circumferentially backwards, relative to an adjacent recording column having been subjected to immediately previous recording, a magnetization pattern at the recording start portion of the adjacent recording column having been subjected to the immediately previous recording will be left without being overwritten, at the circumferentially forward of the recording start position. On the other hand, when the recording end position is shifted circumferentially forward relative to the adjacent recording column having been subjected to immediately previous recording, a magnetization pattern at a recording end portion of the recording column having been subjected to immediately previous recording will be left without being overwritten, at the circumferentially backwards of the recording end position. This is elaborated with reference to FIG. 15, FIG. 16A, and FIG. 16B.

FIG. 15 shows a plurality of recording columns on a magnetic recording medium, each of which is formed so as to partially overlap with a recording column adjacent in the track width direction. FIG. 16A shows the second and third recording columns from the bottom of the recording columns shown in FIG. 15, and FIG. 16B shows the third and fourth recording columns from the bottom of the recording columns shown in FIG. 15. Note that in FIG. 15 and FIG. 16, the magnetic recording medium in the form of disk rotates from the right to left of the figure, and each recording column is formed from the left towards right of the figure as such. In these figures, the adjacent recording columns are formed with overlapping portions. The boarder lines and the center lines of the tracks obtained at the end (tracks at the time of reproducing) are indicated by dotted lines and dashed lines, respectively.

FIG. 16A shows a state in which, due to external disturbance or the like, a recording start position $P_S$(Tr102) of a recording column for forming a track Tr102 is shifted circumferentially backward (towards right of the figure) by a differential $D_S$, relative to a recording start position $P_S$(Tr101) of a recording column for forming the track Tr101. In this case, the recording column for forming the track Tr101 remains without being overwritten at the circumferentially forward of the recording start position $P_S$(Tr102) of the track Tr102. Similarly, FIG. 16B shows a state in which, a recording end position $P_e$(Tr103) of a recording column for forming a track Tr103 is shifted circumferentially forward (towards left of the figure) by a differential $D_e$, relative to a recording end position $P_e$(Tr102) of a recording column for forming a track Tr102. In this case, the recording column for forming the track Tr102 remains without being overwritten at the circumferentially backward of the recording end position $P_e$(Tr103) of the track Tr103.

Further, FIG. 17 is an enlarged view of the recording start portions of a plurality of recording columns formed so as to start from the same recording start position. The following discusses cases where the magnetization patterns formed at the recording start position of the recording columns are distributed in the radial direction; i.e., the recording start portion of the recording column is narrower towards the recording start position, as shown in FIG. 17. In this case, for example, when a recording column to become the track Tr105 is formed as shown in FIG. 17, the magnetization pattern on an adjacent recording column which is the track Tr104 having been subjected to immediately previous recording remains without being overwritten at the circumferentially forward (towards left of the figure) of the recording start position of the track Tr105, even if the recording columns start at the same recording start position. In other words, even though the beginning portion of the track Tr105 has the positive polarity (shown in white), a portion of the magnetization pattern having the negative polarity (shown in black) at the beginning portion of the adjacent recording column which is the track Tr104 having been subjected to immediately previous recording remains without being overwritten at the recording start position $P_S$(Tr104, Tr105) of the track Tr105.

The similar problem also takes place at the recording end position of the recording column. Thus, recording with an existing device may lead to a problem of reproduction errors caused by detecting a magnetization pattern which remains without being overwritten nearby the recording start position or the recording end position of a recording column.

An object of the present invention therefore is to provide a magnetic recording reproducing apparatus and a magnetic recording medium, in which reproduction errors are prevented by, at the time of forming a recording column, preventing a magnetization pattern of an adjacent recording column having been subjected to previous recording from remaining without being overwritten, even when a densely recordable technology such as the Shingle recording method is adopted.

An aspect of the present invention is a magnetic recording reproducing apparatus including: a magnetic recording medium having an information recording area; a magnetic recording element which records information by applying a recording magnetic field to the magnetic recording medium to form recording columns extending in a first direction; a magnetic reproducing element which reproduces information by detecting a leaked magnetic field from the magnetic recording medium; a moving mechanism which moves positions of the magnetic recording element and the magnetic reproducing element relative to the magnetic recording medium, in the first direction and a second direction perpendicular to the first direction; and a controller which controls the magnetic recording element and the moving mechanism to form in the information recording area a plurality of recording columns adjacent to each other in the second direction so that each of the recording columns partially overlap with an adjacent recording column in the second direction. The controller controls the magnetic recording element and the moving mechanism so that a first recording column partially overlap with a previously formed second recording column in the second direction, and that a recording start position of the first recording column is positioned upstream, relative to a recording direction, of a recording start position of the second recording column.

Another aspect of the present invention is a magnetic recording reproducing apparatus including: a magnetic recording medium having an information recording area; a magnetic recording element which records information by applying a recording magnetic field to the magnetic recording medium to form recording columns extending in a first direction; a magnetic reproducing element which reproduces information by detecting a leaked magnetic field from the magnetic recording medium; a moving mechanism which moves positions of the magnetic recording element and the magnetic reproducing element relative to the magnetic recording medium, in the first direction and a second direction perpendicular to the first direction; and a controller which controls the magnetic recording element and the moving mechanism to form in the information recording area a plurality of recording columns adjacent to each other in the second direction so that each of the recording columns partially overlap with an adjacent recording column in the second direction. The controller controls the magnetic recording element and the moving mechanism so that a first recording column partially overlap with a previously formed second recording column in the second direction, and that a recording end position of the first recording column is positioned downstream, relative to a recording direction, of a recording end position of the second recording column.

The wording "recording direction" refers to a direction from the recording start position of a recording column to recording end position.

Yet another aspect of the present invention is a magnetic recording reproducing apparatus including: a magnetic recording medium having an information recording area; a magnetic recording element which records information by applying a recording magnetic field to the magnetic recording medium to form recording columns extending in a first direction; a magnetic reproducing element which reproduces information by detecting a leaked magnetic field from the magnetic recording medium; a moving mechanism which moves positions of the magnetic recording element and the magnetic reproducing element relative to the magnetic recording medium, in the first direction and a second direction perpendicular to the first direction; and a controller which controls the magnetic recording element and the moving mechanism to form in the information recording area a plurality of recording columns adjacent to each other in the second direction so that each of the recording columns partially overlap with an adjacent recording column in the second direction. The controller controls the magnetic recording element and the moving mechanism so that a first recording column partially overlap with a previously formed second recording column in the second direction, and that a recording start portion and a recording end portion of the first recording column do not overlap with the second recording column.

Yet another aspect of the present invention is a magnetic recording medium accommodated in the magnetic recording reproducing apparatus. For each of the recording columns formed so that each recording column partially overlap with an adjacent recording column relative to the second direction, trigger information for the magnetic recording element to start recording is recorded upstream of the recording start position of each recording column so as to be reproducible by the magnetic reproducing element. The trigger information for a recording column whose recording start position is upstream, relative to the recording direction, of that of another recording column is formed upstream of the trigger information for the other recording column.

Note that the "trigger information" is, for example, a "burst pattern" which is a magnetization pattern for the magnetic recording element or the magnetic reproducing element to perform tracking servo control to a track of the magnetic recording medium; a "servo mark pattern" which notifies a beginning of the servo mark; a "track data pattern" recording a track number; or a "sector data pattern" recording a sector number, and is a magnetic pattern different from that in the recording column for recording user-recorded information.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

First Embodiment

Figure 2:
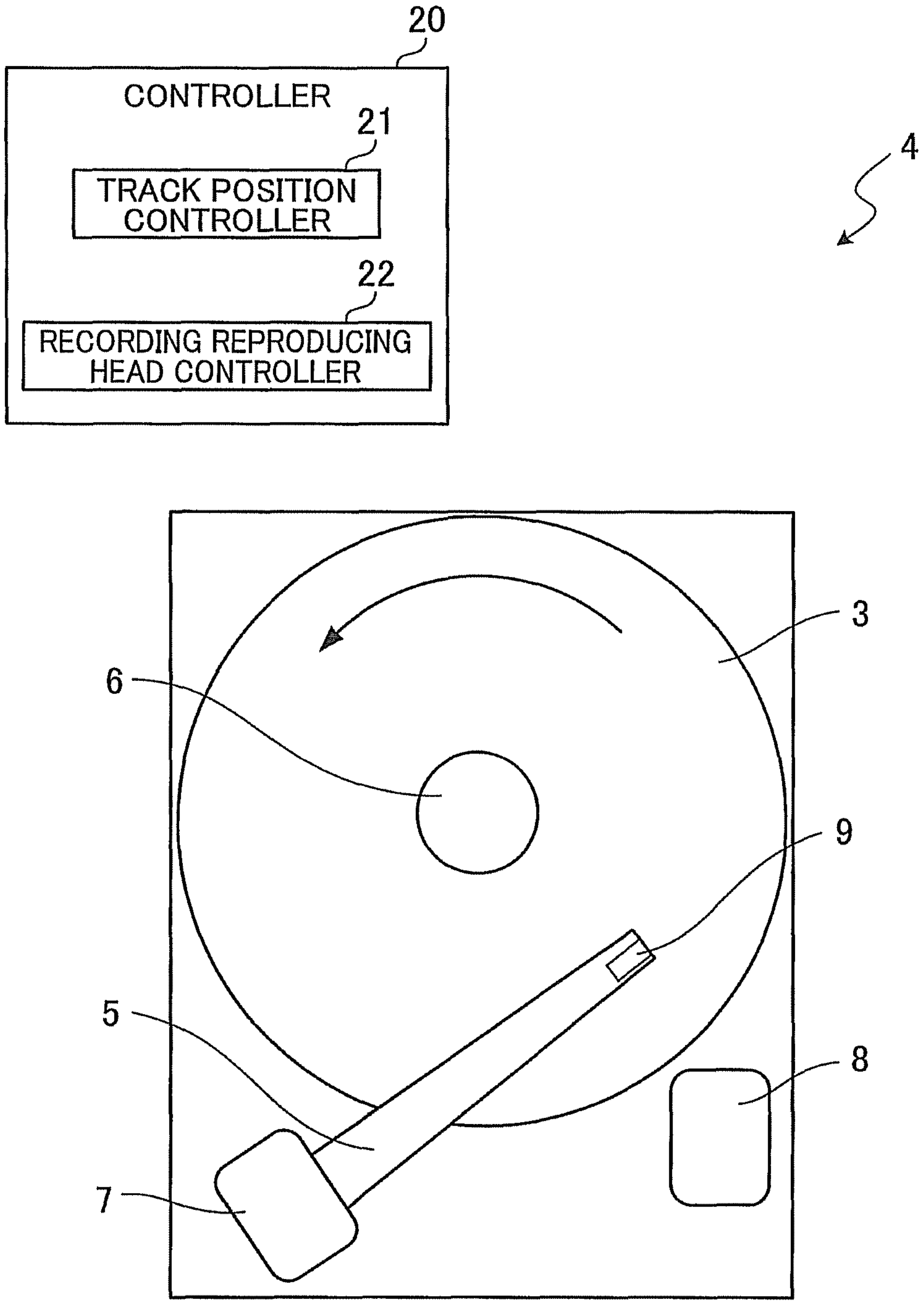
FIG. 2 schematically shows a structure of a magnetic recording reproducing apparatus which performs recording and reproduction with respect to the magnetic recording medium shown in FIG. 1.

As shown in FIG. 2, a magnetic recording reproducing apparatus 4 related to a first embodiment of the present invention includes: a suspension 5, a spindle 6, a voice coil motor 7, a ramp mechanism 8, a recording reproducing head 9, a suspension 5, a voice coil motor 7, and a controller 20 which controls the recording reproducing head 9. In the present embodiment, the magnetic recording reproducing apparatus 4 includes a magnetic recording medium 3 in the form of disc. The structure of the magnetic recording medium 3, the recording and reproduction method of the magnetic recording medium 3 by the magnetic recording reproducing apparatus 4, and the details of the controller 20 are explained later.

The suspension 5 has one end portion fixed to the voice coil motor 7 and another end portion far from the voice coil motor 7 having a recording reproducing head 9 which applies a magnetic field to the magnetic recording medium 3. The spindle 6 rotates the magnetic recording medium 3 counterclockwise (the direction of the arrow shown in FIG. 2), when the magnetic recording reproducing apparatus 4 records or reproduces information to or from the magnetic, recording medium 3. At the center portion of the magnetic recording medium 3 is formed a hole to which the spindle 6 is fit. The voice coil motor 7 moves the suspension 5 so that the recording reproducing head 9 attached to the suspension 5 moves above the magnetic recording medium 3 in radial directions (cross-track directions: second directions) of the magnetic recording medium 3. In other words, the recording reproducing head is capable of changing its position relative to the radial directions of the magnetic recording medium 3, according to the movement of the voice coil motor 7'. The ramp mechanism 8 is for setting back the recording reproducing head 9 when no recording or reproduction of information is performed to or from the magnetic recording medium 3. In other words, when no recording or reproduction of information is performed, the recording reproducing head 9 is fixed to the ramp mechanism 8.

The spindle 6, a not-shown motor (relating to movement in the first directions) which rotates the spindle 6, the suspension 5, and the voice coil motor 7 (related to movement in second directions) structure a "moving mechanism" of the present embodiment.

Figure 3:
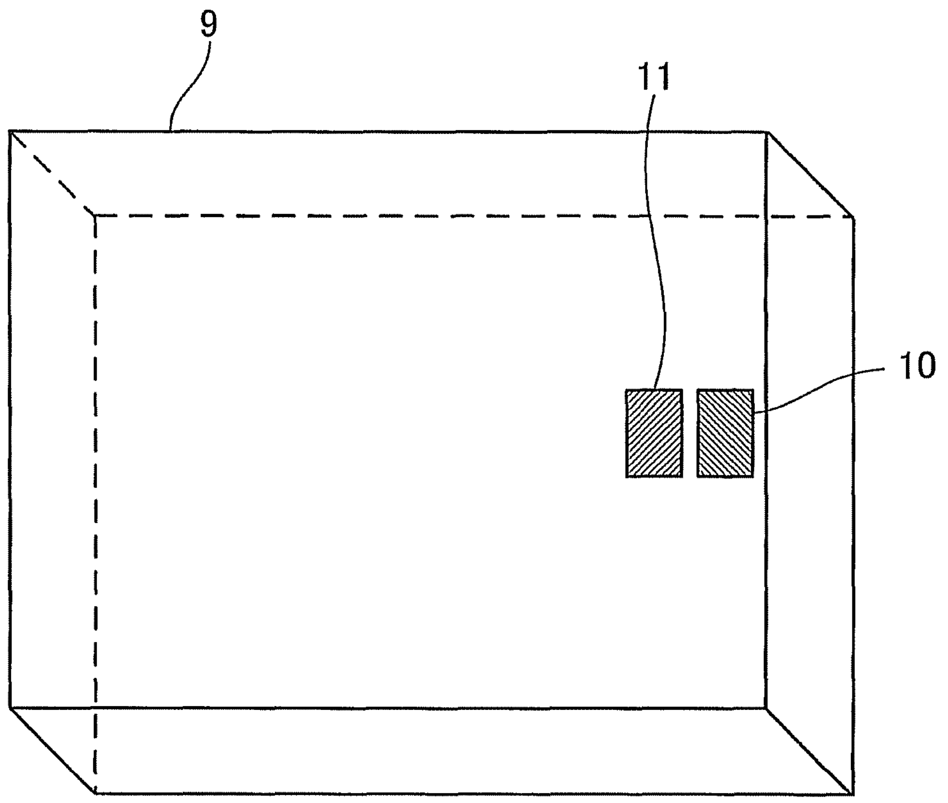
FIG. 3 schematically shows a structure of a recording reproducing head of the magnetic recording reproducing apparatus shown in FIG. 2.

The recording reproducing head 9 is for recording and reproducing magnetic information. As shown in FIG. 3, the surface of the recording reproducing head 9 close to the magnetic recording medium 3 (i.e., the surface facing the magnetic recording medium 3) is provided with a magnetic recording element 10 and a magnetic reproducing element 11 for a vertical magnetic recording medium.

The magnetic recording element 10, when recording information to the magnetic recording medium 3, applies a magnetic field of a recordable intensity to the magnetic recording medium 3, thereby forming a recording column extended in a circumferential direction (track direction: first direction) of the magnetic recording medium 3. This way, for example, the direction of magnetization on the magnetic recording medium 3 is determined. The magnetic reproducing element 11 reads a magnetization pattern by detecting a leaked magnetic field from the magnetic recording medium 3, thereby reproducing the information. The magnetic recording element 10 and the magnetic reproducing element 11 have a positional relationship relative to the circumferential direction such that the magnetic reproducing element 11 first passes a position of the rotating magnetic recording medium 3, and then the magnetic recording element 10 passes the same position.

The magnetic recording reproducing apparatus 4 is capable of performing recording and reproduction to a predetermined position of the magnetic recording medium 3, with the operations of the spindle 6 and the suspension 5, and by controlling application of the magnetic field by the recording reproducing head 9. In other words, the magnetic recording reproducing apparatus 4 includes a controller 20 which performs a predetermined computing process for controlling various functions of the suspension 5, spindle 6, or the like. The controller 20 is realized by a CPU (Central Processing Unit) or the like. As shown in FIG. 2, the controller 20 includes: a track position controller 21 which controls the suspension 5 and the voice coil motor 7 thus enabling tracking of a predetermined track (the track to be followed and subjected to recording or reproduction); a recording head controller 22 which controls the recording reproducing head 9 to record information to the magnetic recording medium 3 at a predetermined timing. In the present embodiment, the spindle 6 and the not-shown motor for rotating the spindle 6 rotates the magnetic recording medium 3 at a constant speed, and is not controlled by the controller 20.

Next, the following describes a magnetic recording medium 3 included in the magnetic recording reproducing apparatus 4. The magnetic recording medium 3 of the present embodiment is manufactured by: forming a magnetic layer on a glass substrate; polishing the surface to smoothen the same;

and applying a lubricant. The material agnetic layer) which forms a magnetic recording part may be, for example, Co, Pt, Fe, Ni, Cr, Mn, or an alloy of any of these metals. Examples of the above alloy include, for example, CoPt, SmCo, CoCr, and TbFeCo alloy. Further, in the manufacturing method of the magnetic recording medium 3, the magnetic recording surface is formed only on one side of the magnetic recording medium 3. However, the present invention is not limited to this, and the magnetic recording surface may be formed on both sides of the magnetic recording medium 3. In such a case, the above mentioned processes of the manufacturing method are carried out on both sides of the magnetic recording medium 3. Note that application of the lubricant on the magnetic recording surfaces on both sides of the magnetic recording medium 3 may be carried out at the same time.

Figure 1:
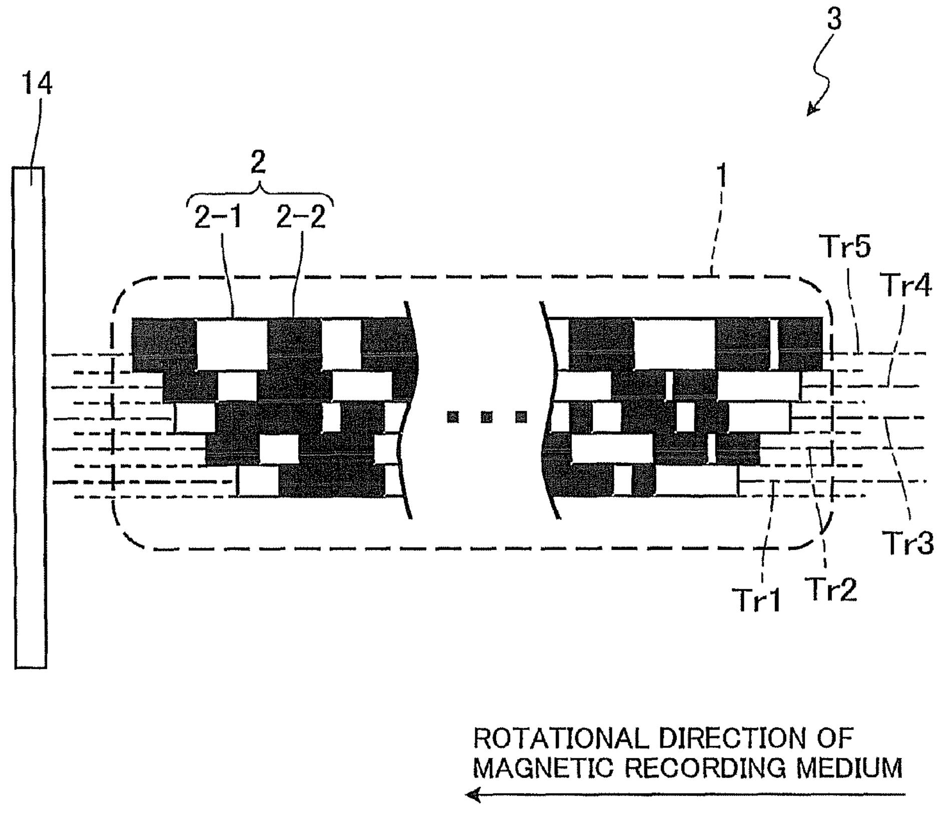
FIG. 1 schematically shows a plurality of recording column formed on a magnetic recording medium related to a first embodiment of the present invention.

As shown in FIG. 1, on the magnetic recording medium 3 is formed a burst pattern 14 which is a magnetization pattern of trigger information for tracking servo control for each track on the magnetic recording medium 3, and for starting recording of the magnetic recording element 3. For example, the burst pattern 14 is formed by a servo track writer (STW) at the time of manufacturing the magnetic recording reproducing apparatus 4. As hereinbelow mentioned, the burst pattern 14 is formed for each of the plurality of recording columns on the magnetic recording medium 3, and is recorded reproducibly by the magnetic reproducing element 11. In the present embodiment, the burst pattern 14 is extended in a belt-like manner in a radial direction of the magnetic recording medium 3.

Next, the following describes control performed by the controller 20. As mentioned hereinabove, the controller 20 controls the suspension 5, the voice coil motor 7, and the recording reproducing head 9 to form on the magnetic recording medium 3 a plurality of recording columns shown in FIG. 1. Since the rotational direction of the magnetic recording medium 3 is from the right to left (arrow direction) of FIG. 1, each of the recording columns is formed from the left to the right side of the figure. For example, the magnetic recording medium 3 is a type of medium on which information is recorded by magnetizing the medium in a direction perpendicular to its in-plane direction. In FIG. 1, a magnetization pattern 2-(positive polarity) of the present embodiment which is in a direction from the viewer of the figure towards the figure is shown in white, and a magnetization pattern 2-2 (negative polarity) which is in a direction from the figure towards the viewer of the figure is shown in black. These patterns are simply referred to as magnetization pattern 2, unless their polarities need to be distinguished.

As shown in FIG. 1, the controller 20 forms on the magnetic recording medium 3 a plurality of recording columns each extended in the circumferential direction of on the magnetic recording medium 3. These recording columns are formed sequentially in a radial direction from one side (from the bottom of the figure in the present embodiment) to the other side (upper portion of the present embodiment) of the magnetic recording medium 3. Note that the recording columns may be sequentially formed in a direction from the inner circumference towards the outer circumference of the recording medium 3 or in the opposite direction. The recording columns formed on the magnetic recording medium 3 are formed so that each recording column partially overlaps in the radial direction another recording column adjacent relative to the radial direction. In other words, the magnetization pattern in each recording column has a portion relative to the width direction (radial direction) which is overwritten by a recording column formed immediately after. FIG. 1 shows tracks Tr1, Tr2, Tr3, Tr4, and Tr5 sequentially formed from the bottom to the top of the figure. Note that the border line of each track and the center line of each track are indicated by a dotted line and a dashed line in FIG. 1, respectively.

Figure 4A:
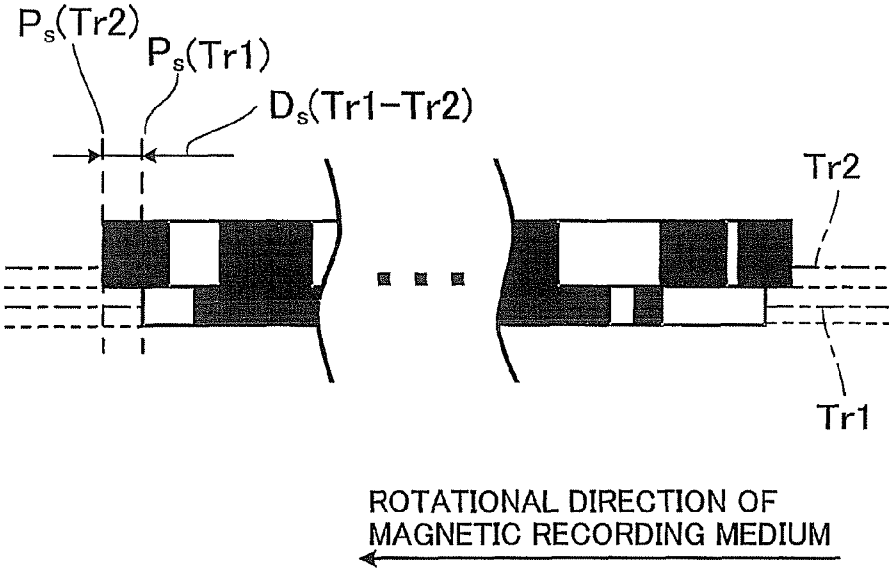
FIG. 4A and FIG. 4B both show magnetization status immediately after a recording column for forming a track Tr2 of FIG. 1 is recorded.

As shown in FIG. 4A, a recording start position $P_S$(Tr2) of a recording column for forming a track Tr2 is positioned upstream, relative to a recording direction (direction from the left to the right of the figure), of a recording start position $P_S$(Tr1) of an immediately previously formed recording column for a track Tr1 by a differential $D_S$(Tr1−Tr2). In other words, there is no remaining recording column for the track Tr1 upstream, relative to the recording direction, of the recording start position $P_s$(Tr2) of the track Tr2. The differential $D_S$(Tr1−Tr2) is set to a predetermined value or higher in consideration of an error in the recording start positions $P_S$(Tr1) and $P_S$(Tr2) caused by an external disturbance or the like, so that the error rate is not more than a predetermined threshold (see Third Embodiment). As shown in FIG. 1, of the recording columns formed on the magnetic recording medium 3, a recording column formed later than another recording column has its recording start position formed upstream of the other recording column relative to the recording direction.

Figure 4B:
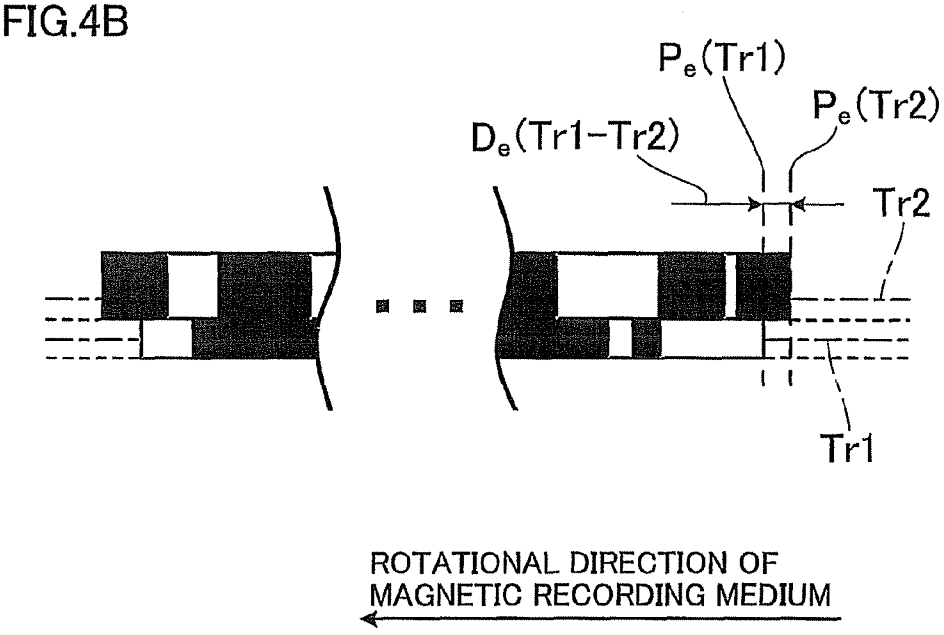

As shown in FIG. 4B, a recording end position $P_e$(Tr2) of the recording column for the track Tr2 is positioned downstream, relative to the recording direction (from the left to the right in the figure), of a recording end position $P_e$(Tr1) of the immediately previously formed recording column for the track Tr1 by a differential $D_e$(Tr1−Tr2). In other words, there is no remaining recording column for the track Tr1 downstream, relative to the recording direction, of the recording end position $P_e$(Tr2) for the track Tr2. The differential $D_e$(Tr1−Tr2) is set to a predetermined value or higher in consideration of an error in the recording end positions $P_e$(Tr1) and $P_e$(Tr2) caused by an external disturbance or the like, so that the error rate is not more than a predetermined threshold (see Third Embodiment). As shown in FIG. 1, of the recording columns formed on the magnetic recording medium 3, a recording column formed later than another recording column has its recording end position formed downstream of the other recording column, relative to the recording direction.

Thus, the recording start portion (portion very close to the recording start position) and the recording end portion (portion very close to the recording end position) of each recording column formed on the magnetic recording medium 3 do not overlap with an immediately previous recording column.

In the present embodiment, each recording column may have an AC erase pattern which is formed through an AC erase operation by the magnetic recording element 10.

Figure 5:
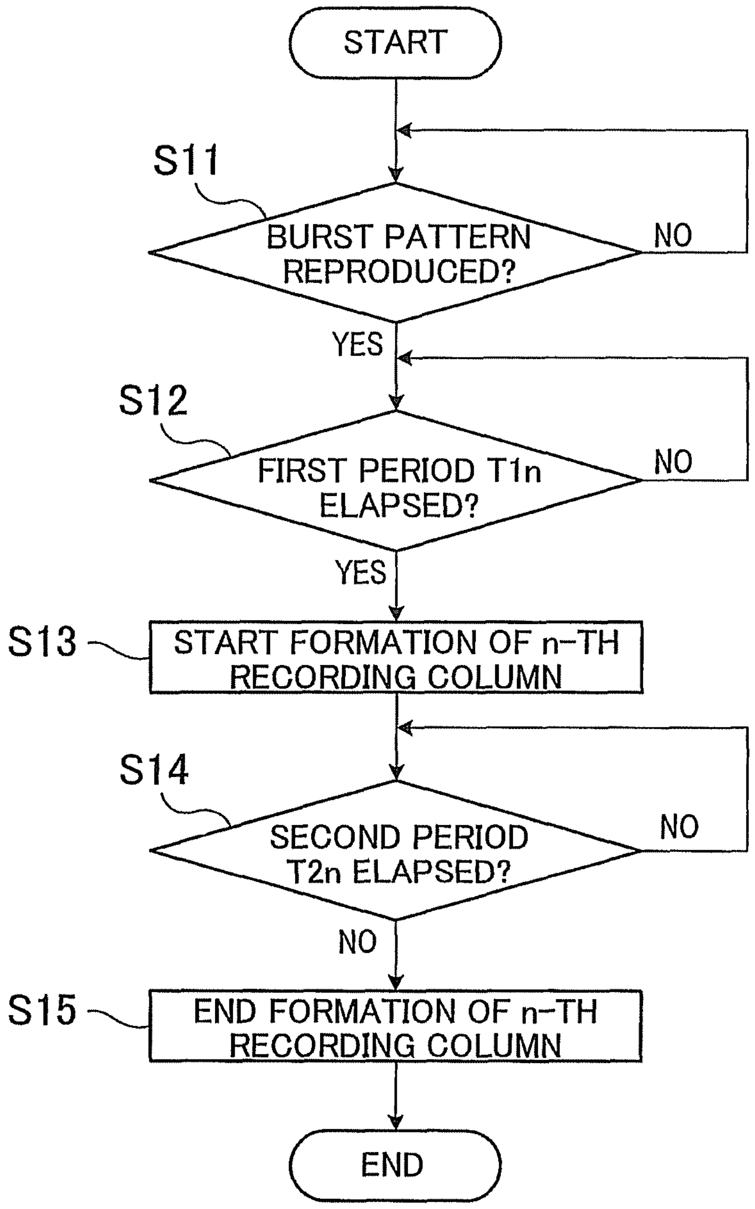
FIG. 5 is a flowchart of a process carried out by the controller shown in FIG. 2.

The following describes steps of a process performed by the controller 20, with reference to FIG. 5. FIG. 5 is a flowchart showing the steps of forming an n-th recording column (where n is a natural number ranging from 1 to N) on the magnetic recording medium 3. In the present embodiment, all the recording columns are formed at an equal angular rate.

First, there is determined whether or not the burst pattern 14 formed on the magnetic recording medium 3 is reproduced by the magnetic reproducing element 11 (S11). This determination in S11 is repeated until the burst pattern 14 is determined as to be reproduced. When it is determined that the burst pattern 14 has been reproduced (S11: YES), there is determined whether or not a first period $T1_n$ has elapsed from the point of reproducing the burst pattern 14, before formation of a recording column (S12). The first period $T1_n$ is shorter than the first period $T1_{n-1}$ at the time of recording the (n−1)th recording column. Therefore, the recording start position of the n-th recording column will be upstream of the recording start position of the (n−1)th recording column, relative to the recording direction. In other words, the recording start position of a recording column formed later is set upstream of the recording start position of the previous recording column, relative to the recording direction. The determination in S12 is repeated until the first period $T1_n$ is determined as to be elapsed.

When the first period $T1_n$ is determined as to elapsed (S12: YES), formation of the n-th recording column is started (S13). Note that, at this time, the n-th recording column is formed so as to partially overlap the (n−1)th recording column in the radial direction. Next, there is determined whether or not a second period $T2_n$ has elapsed from the point of reproducing the burst pattern 14, before formation of the recording column (S14). The second period $T2_n$ is longer than the second period $T2_{n-1}$ for recording the (n−1)th recording column. Therefore, the recording end position of the n-th recording column is downstream of the recording end position of the (n−1)th recording column relative to the recording direction. In other words, the recording end position of a recording column formed later is set downstream of the recording end position of the previous recording column, relative to the recording direction. The determination in S14 is repeated until the second period $T2_n$ is determined as to be elapsed. When the second period $T2_n$ is determined as to be elapsed (S14: YES), formation of the n-th recording column is ended (S15).

Repeating the above steps N times, while partially overlapping each recording column with an immediately previously formed recording column relative to the radial direction of the magnetic recording medium 3, forms a magnetic recording medium 3 with N-number of recording columns.

As hereinabove mentioned, with the magnetic recording reproducing apparatus 4 of the present embodiment, the controller 20 which controls the suspension 5, the voice coil motor 7, and the recording reproducing head 9 so that the n-th recording column is partially overlapped in the radial direction with the (n−1)th recording column, i.e., the immediately previously formed recording column. Further, the control is performed so that the recording start position of the n-th recording column is positioned upstream, relative to the recording direction, of the recording start position of the (n−1)th recording column. Further, the control is performed so that the recording end position of the n-th recording column is positioned downstream, relative to the recording direction, of the recording end position of the (n−1)th recording column. Thus, a magnetization pattern at the recording start portion of a recording column will not remain nearby the recording start position of a subsequent recording column. Further, a magnetization pattern at the recording end portion of a recording column will not remain nearby the recording end position of a subsequent recording column. Therefore, the reproduction error is reduced. In particular, formation of a pattern for drawing a PLL (Phase Locked Loop) nearby the recording start position may lead to a PLL-drawing error such as generation of wrong clock, due to a reproduction error. However, the PLL-drawing error is less likely to occur in the above structure.

Note that, when the recording column includes an AC erase pattern, for example, even if the AC erase pattern is formed nearby the recording start position or nearby the recording end position, it is less likely that the magnetization pattern of an adjacent recording column which is left without being overwritten is inadvertently detected.

Further, with the magnetic recording reproducing apparatus 4 of the present embodiment, the controller 20 performs control so that, of a plurality of recording columns successively formed in a radial direction of the magnetic recording medium 3, the recording start position of a recording column formed later is set upstream of the recording start position of the previous recording column, relative to the recording direction. Further, the recording end position of a recording column formed later is set downstream, relative to the recording direction, of the recording end position of the previous recording column. Thus, when a plurality of recording columns are successively formed in a radial direction, a magnetization pattern at a recording start portion of each recording column completely overwrites the magnetization pattern at the recording start position of an adjacent recording column having been subjected to immediately previous recording. Further, a magnetization pattern at a recording end portion of each recording column completely overwrites the magnetization pattern at the recording end position of an adjacent recording column having been subjected to immediately previous recording.

Second Embodiment

Next, the following describes a second embodiment of the present invention. Note that members and parts that are identical to those in the first embodiment, and no further details for them are provided below.

Figure 6:
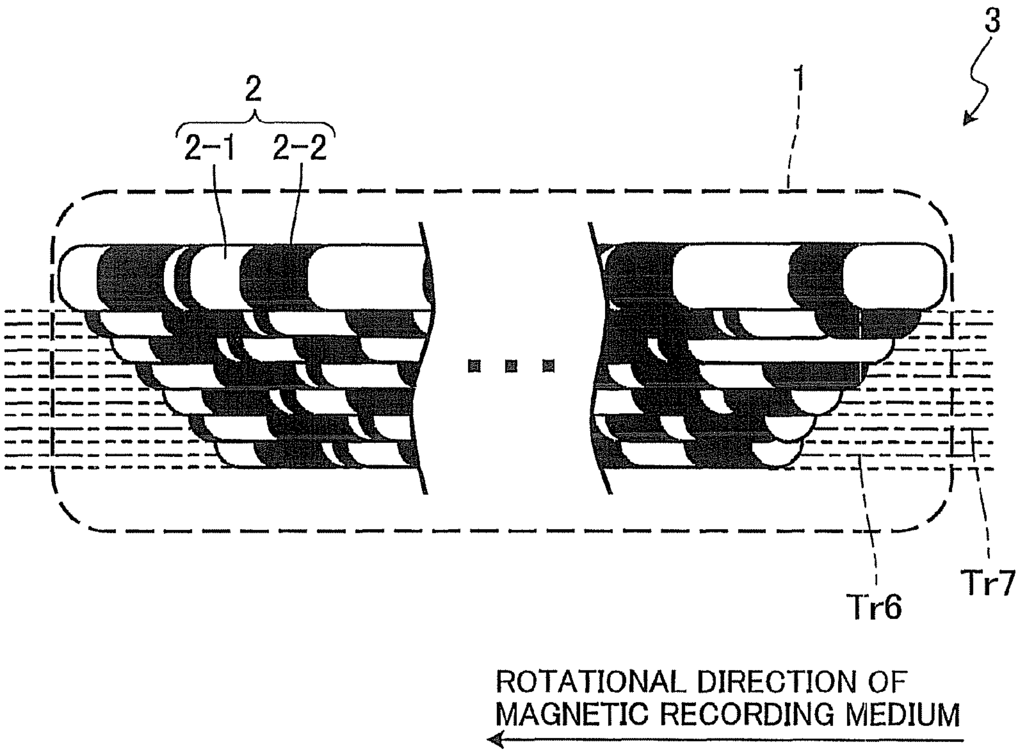
FIG. 6 schematically shows a plurality of recording columns formed on a magnetic recording medium in a magnetic recording reproducing apparatus related to a second embodiment of the present invention.
Figure 7A:
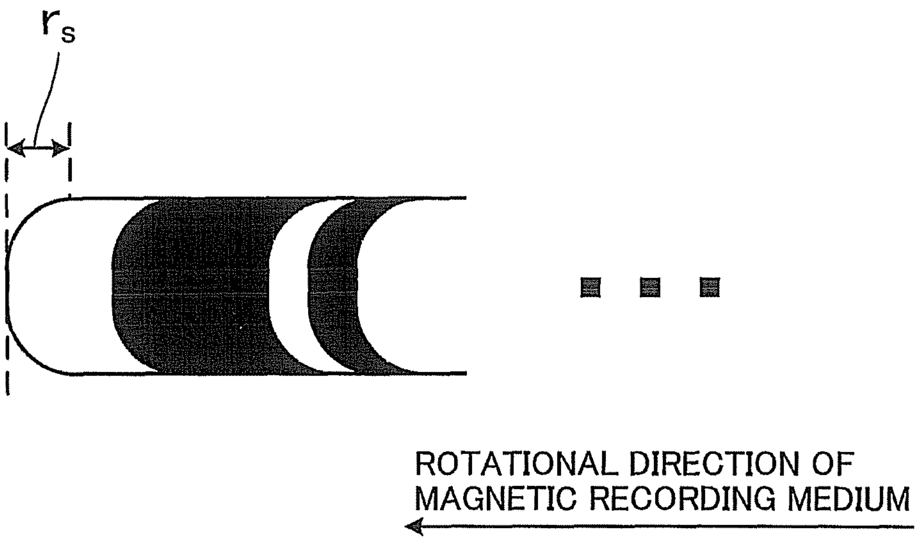
FIG. 7A and FIG. 7B both provide an enlarged view of a recording start portion and a recording end portion of a recording column shown in FIG. 6.
Figure 7B:
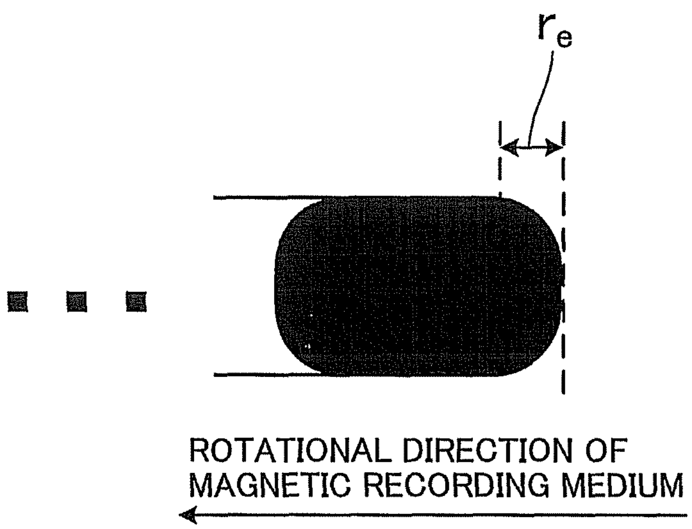

As shown in FIG. 6, in the present embodiment, a plurality of recording columns are formed sequentially in a radial direction from one side (from the bottom of the figure in the present embodiment) to the other side (to the upper portion of the figure in the present embodiment) of the recording medium 3, as in the first embodiment. As shown in FIG. 6, in the present embodiment, a magnetization pattern 2 of each recording column is formed in a crescent shape, which reflects the shape of the magnetic recording element 10 which applies a recording magnetic field. That is, as shown in FIG. 7A, a leading end portion of the recording column, which is a portion having a length of $r_s$ from the recording start position in the circumferential direction of the magnetic recording medium 3, is narrowed towards recording start position. In other words, the leading end portion is an area covering length r from the recording start position, in which area the width of the recording column is gradually increased. Within this area, the width of the recording column is reduced towards the leading end. On the other hand, as shown in FIG. 7B, a trailing end portion of the recording column, which is a portion having a length of $r_e$ from the recording end position in the circumferential direction, is narrowed down towards the recording end position. In other words, the trailing end portion is an area covering a length $r_e$ from the recording end position, in which area the width of the recording column is gradually increased. Within this area, the width of the recording column is narrowed towards the trailing end.

Figure 8A:
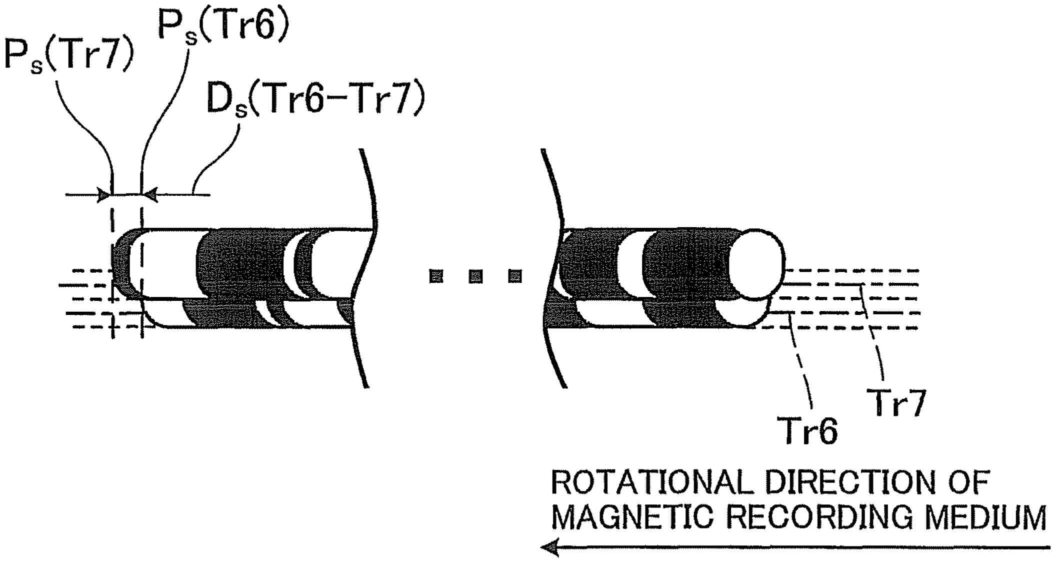
FIG. 8A and FIG. 8B both show magnetization status immediately after a recording column for forming a track Tr7 of FIG. 6 is recorded.

In the present embodiment, the controller 20 performs control so that a recording start position $P_S$(Tr7) of a recording column for forming a track Tr7 is positioned upstream, relative to the recording direction (direction from the left to the right of the figure), of a recording start position $P_S$(Tr6) of a recording column for a track Tr6 by a differential $D_S$(Tr6−Tr7), as shown in FIG. 8A. The control at this time is performed so as to satisfy $D_S$ (Tr6−Tr7)>$r_s$. This way, the recording column for the track Tr6 will not remain without being overwritten upstream, relative to the recording direction, of the recording start position $P_S$(Tr7) of the track Tr7.

Figure 8B:
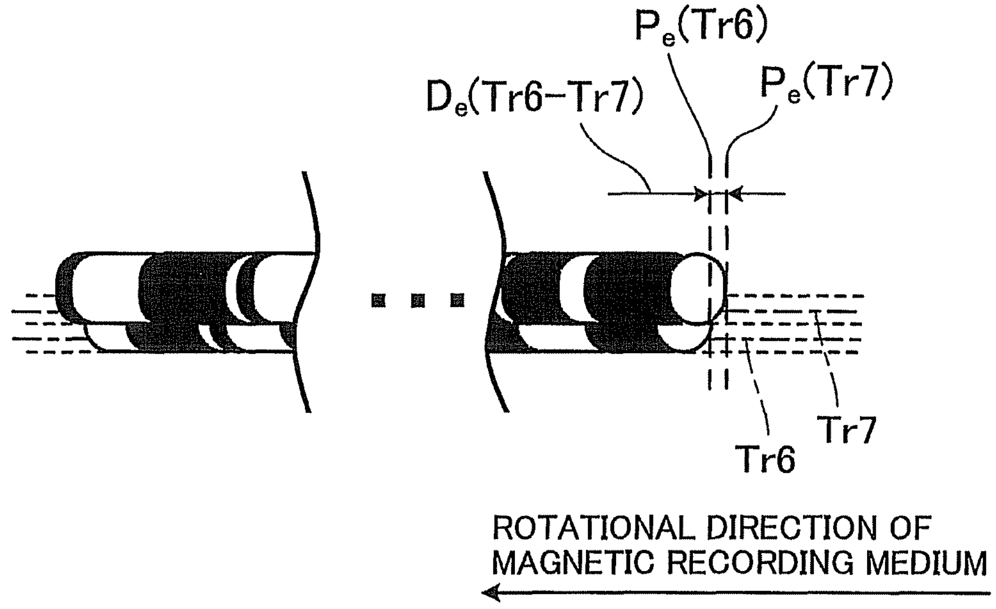

Further, the controller 20 performs control so that a recording end position $P_e$(Tr7) of a recording column for forming a track Tr7 is positioned downstream, relative to the recording direction (direction from the left to the right of the figure), of a recording end position $P_e$(Tr6) of a recording column for a track Tr6 by a differential $D_e$(Tr6–Tr7), as shown in FIG. 8B. The control at this time is performed so as to satisfy $D_e$ (Tr6–Tr7)>$r_e$. This way, the recording column for the track Tr6 will not remain without being overwritten downstream, relative to the recording direction, of the recording end position $P_e$(Tr7) for the track Tr7.

In the recording column formed by the magnetic recording reproducing apparatus 4 of the present embodiment, a leading end portion of the recording column, which is a portion having a length of $r_s$ from the recording start position in the circumferential direction of the magnetic recording medium 3, is narrowed towards the recording start position. Further, the trailing end portion of the recording column, which is a portion having a length of $r_e$ from a recording end position in the circumferential direction, is narrowed towards the recording end position. The controller 20 performs control so as to satisfy $D_S$>$r_s$, where $D_S$ is a length of the difference between recording start positions of adjacent recording columns, relative to the circumferential direction of the magnetic recording medium 3. Further, the control is performed so as to satisfy $D_e$>$r_e$, where $D_e$ is a length of the difference between recording end positions of adjacent recording columns, relative to the circumferential direction of the magnetic recording medium 3. Thus, even when the leading end portion of the recording column is narrowed towards the recording start position, each recording column reliably overwrites the magnetization pattern at the recording start portion of an adjacent recording column having been formed immediately previously, as in the case of first embodiment. Further, even when the trailing end portion of the recording column is narrowed towards the recording end position, each recording column reliably overwrites the magnetization pattern at the recording end portion of an adjacent recording column having been formed immediately previously, as in the case of first embodiment.

Third Embodiment

Next, the following describes a third embodiment of the present invention. Note that members and parts that are identical to those in the first embodiment, and no further details for them are provided below.

Figure 9:
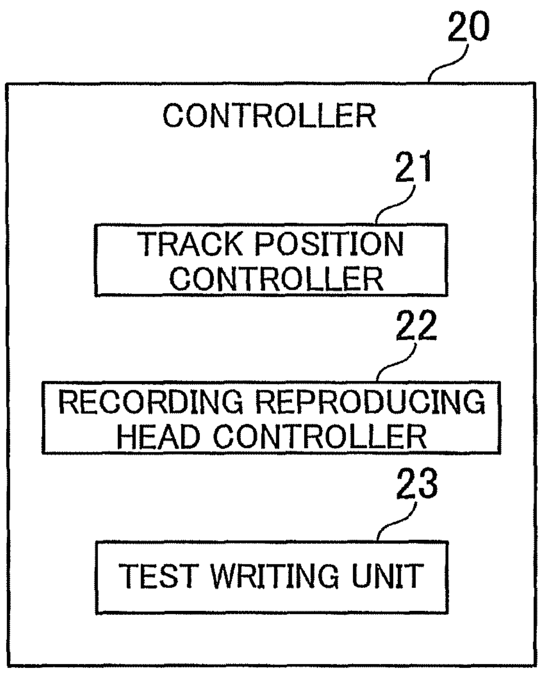
FIG. 9 is a block diagram showing a structure of a controller in a magnetic recording reproducing apparatus related to a third embodiment of the present invention.

As shown in FIG. 9, in the present embodiment, the controller 20 includes a test writing unit 23, in addition to the track position controller 21 and the recording head controller 22. The test writing unit 23 controls test writing for determining a differential $D_s$ which is a differential between recording start positions of recording columns relative to the circumferential direction, the recording columns being adjacent to each other in a radial direction of the magnetic recording medium 3.

Figure 10A:
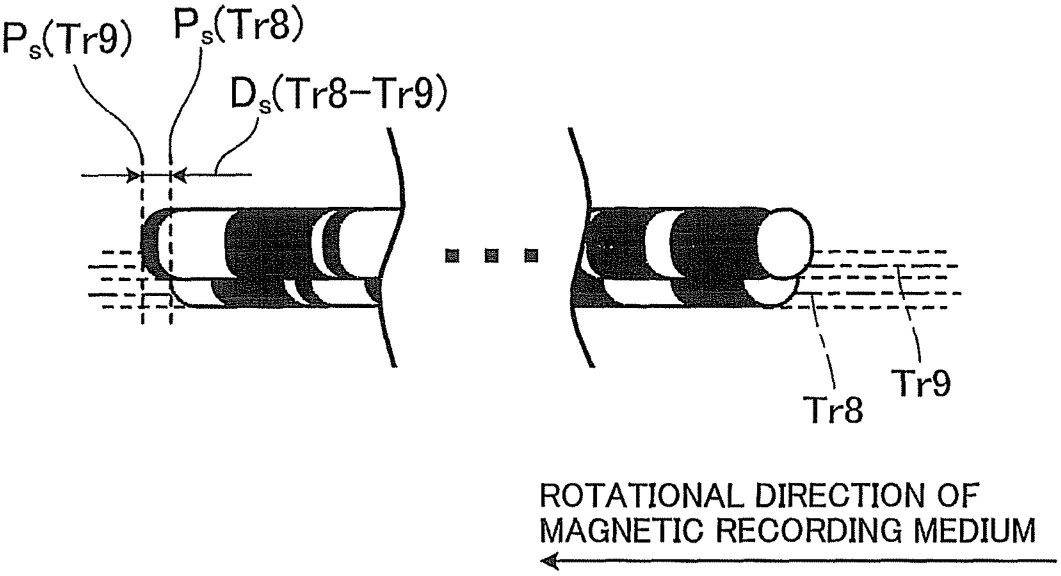
FIG. 10A is a figure explaining test writing performed by a test writing unit shown in FIG. 9, and shows a state in which recording columns for tracks Tr8 and Tr9 are test-written.

As shown in FIG. 10A, the test writing unit 23 performs control so that a recording column for a track Tr8 and a recording column for a track Tr9 are formed through test writing. In the present embodiment, the polarity at the recording start position is made different between these two recording columns. For example, as shown in FIG. 10A, the polarity at the recording start portion of the recording column for track Tr8 is positive (shown in white), and the polarity at the recording start portion of the recording column for track Tr9 is negative (shown in black).

Figure 10B:
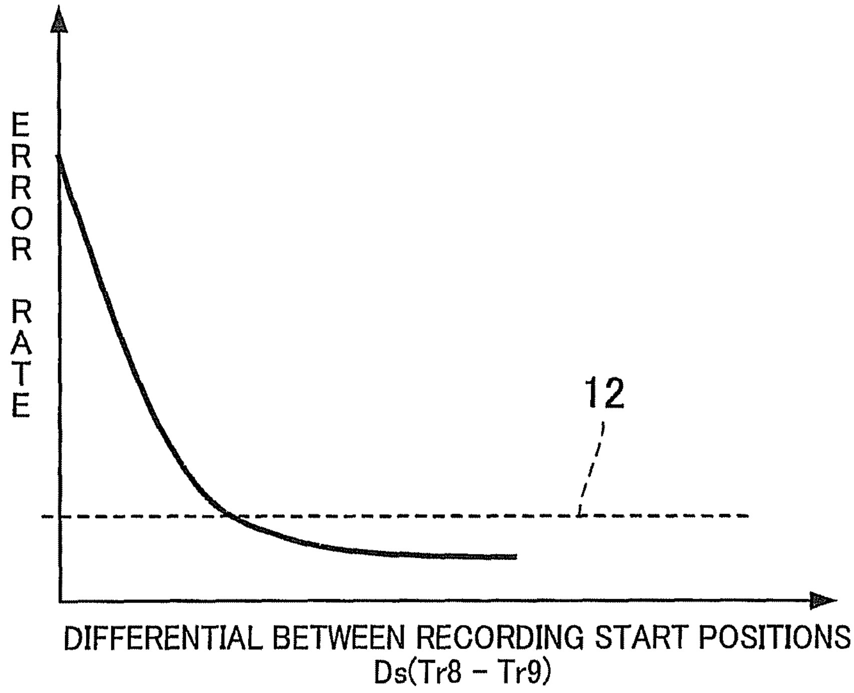
FIG. 10B shows the dependency of the error rate of the track Tr9 relative to starting position differential $D_S$(Tr8−Tr9).

The test writing unit 23 performs more than once the above described test writing and an operation of reproducing the track Tr9 formed by the test writing, while varying the differential $D_s$(Tr8–Tr9) between recording start positions of the two recording columns, relative to the circumferential direction. The graph obtained through this is shown in FIG. 10B. The dotted line 12 in the graph of FIG. 10B indicates a threshold of error rate as an index value. The test writing unit 23 determines the differential $D_s$(Tr8–Tr9) between the recording start positions so that the error rate obtained is not more than the threshold. By using the value for recording control of actual recording columns, there is provided a magnetic recording reproducing apparatus 4 in which reproduction error hardly occurs.

Similarly, the test writing unit 23 performs more than once test writing for forming two recording columns and an operation of reproducing the track Tr9 formed by the test writing, while varying the differential $D_e$(Tr8–Tr9) between recording end positions of the two recording columns, relative to the circumferential direction. At the time of test writing, the polarity at the recording end position is different between the two recording columns. The test writing unit 23 then determines the $D_e$(Tr8–Tr9) which results in the error rate not more than a predetermined threshold. Using this value, recording control for actual recording columns is performed.

As described, the magnetic recording reproducing apparatus of the present embodiment includes the test writing unit 23 which performs, more than once, test writing for forming two recording columns, and an operation of reproducing the track of later formed one of the two recording columns, while varying the differential $D_s$ between the recording start positions of the two recording columns, and determines the differential $D_s$ to which result in an error rate of not more than a predetermined threshold, during the operation of reproduction. Further, the test writing unit 23 determines the differential $D_e$ between recording end positions of the two recording columns so that the error rate is not more than a predetermined threshold. This way, suitable $D_s$ and $D_e$ which hardly cause reproduction errors are obtained.

Further, when test writing the two recording columns for determining the differential $D_s$ between the recording start positions, the test writing unit 23 of the present embodiment makes the polarity at the recording start position different between the two recording columns. Therefore, when the magnetization pattern at the recording start portion of the previously formed recording column remains nearby the recording start position of the later formed recording column, the positive and negative of the signal waveform detected at the beginning in the track of the later formed recording column will be opposite to the signal waveform intended. This makes it easier to determine if there is a remaining magnetization pattern of the previously-recorded recording column. Further, the polarity at the recording end position is made different between the two recording columns formed through test writing for determining the differential $D_e$ between recording end positions of the two recording columns. Therefore, when the magnetization pattern at the recording end portion of the previously formed recording column remains nearby the recording end position of the later formed recording column, the positive and negative of the signal waveform detected at the end in the track of the later formed recording column will be opposite to the signal waveform intended. This makes it easier to determine if there is a remaining magnetization pattern of the previously-recorded recording column.

Fourth Embodiment

Next, the following describes a fourth embodiment of the present invention. Note that members and parts that are identical to those in the first embodiment, and no further details for them are provided below.

Figure 11:
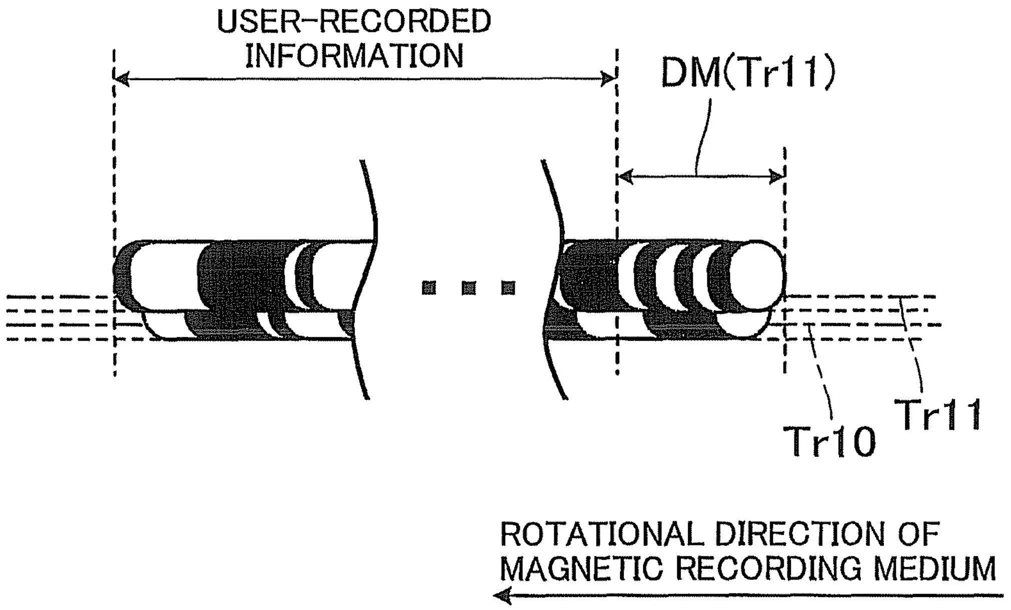
FIG. 11 shows recording columns formed on a magnetic recording medium included in a magnetic recording reproducing apparatus related to a fourth embodiment of the present invention.

In the present embodiment, when a recording column is formed on a magnetic recording medium 3, user-recorded information is allocated to the recording column. As shown in FIG. 11, the controller 20 forms a dummy recording portion DM (Tr11) on a recording column for track Tr11, when the recording end position of the user-recorded information in the recording column for track Tr11 is positioned upstream (left in the figure), relative to the recording direction, of the recording end position of the immediately previously formed recording column for track Tr10. The dummy recording portion DM (Tr11) is formed in a range from the recording end position of the user-recorded information in the recording column for track Tr11 to a position downstream (right in the figure), relative to the recording direction, of the recording end position of the recording column for track Tr10. In the dummy recording portion DM (Tr11) of the present embodiment, a dummy pattern in which polarity is changed at constant intervals is formed. The dummy pattern however is not limited to this. For example, the dummy patter may be a DC pattern in which the polarity is constant.

Figure 12:
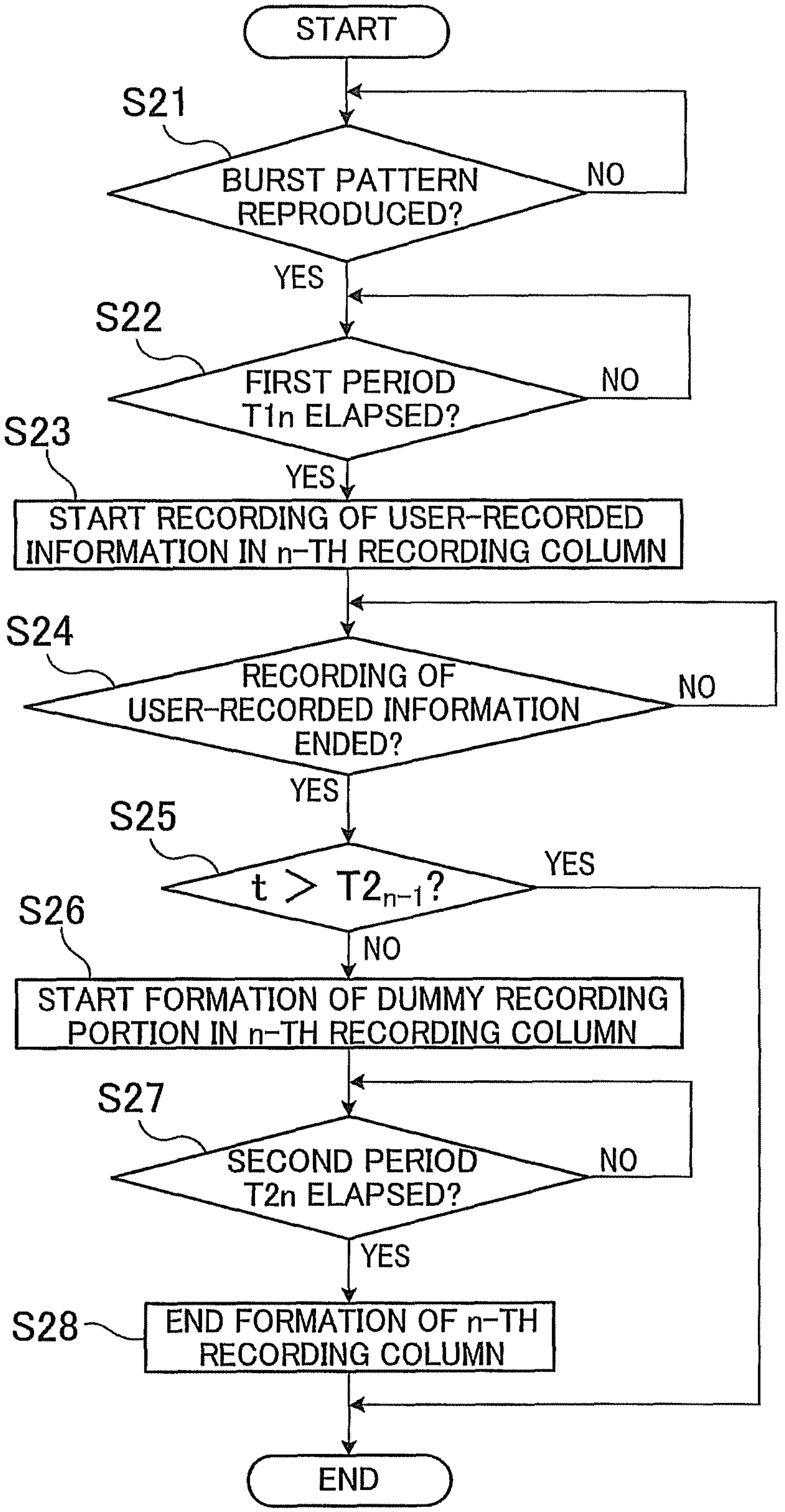
FIG. 12 is a flowchart of a process carried out by a controller in the magnetic recording reproducing apparatus of the fourth embodiment.

The following describes, with reference to FIG. 12, the steps of a process carried out by the controller 20 of the present embodiment. FIG. 12 is a flowchart showing the steps of forming an n-th (where n is a natural number between 1 and N) recording column on the magnetic recording medium 3. Note that, in the present embodiment, all the recording columns are formed, at an equal angular rate.

First, similarly to the steps of the first embodiment, whether or not the burst pattern 14 is reproduced is determined (S21). When it is determined that the burst pattern 14 is reproduced (S21: YES), there is determined whether or not a first period $T1_n$ elapsed from the point of reproducing the burst pattern 14, before formation of the recording column (S22). The first period $T1_n$ is shorter than the first period $T1_{n-1}$ at the time of recording the (n−1)th recording column. When the first period $T1_n$ is determined as to elapsed (S22: YES), recording of user-recorded information in the n-th recording column is started (S23).

Next, whether or not the recording of the user-recorded information is completed is determined (S24). This determination in S24 is repeated until the recording of the user-recorded information is determined as to be completed. When it is determined that the recording of the user-recorded information is completed (S24: YES), there is determined whether or not the elapsed time t at the time from the point of reproducing the burst pattern 14 is longer than a second period $T2_{n-1}$ (period between reproduction of the burst pattern 14 to completion of formation of the (n−1)th recording column) for recording the (n−1)th recording column (S25). When the elapsed time t is determined as to be longer than the second period $T2_{n-1}$ (S25: YES), i.e., when the recording end position of the user-recorded information in the n-th recording column is at downstream, relative to the recording direction, of the recording end position of the immediately previously formed (n−1)th recording column, later-described S26 to S28 are omitted and formation of the n-th recording column is completed.

On the other hand, when the elapsed time t is determined as to be not more than the second period $T2_{n-1}$ (S25: NO), i.e., the recording end position of the user-recorded information in the n-th recording column is at upstream, relative to the recording direction, of the recording end position of the immediately previously formed (n−1)th recording column, formation of the dummy recording portion in the n-th recording column is started (S26). This way, the n-th recording column has a dummy recording portion subsequently to the recording end position of the user-recorded information.

Next, there is determined whether or not a second period $T2_n$ has elapsed from the point of reproducing the burst pattern 14 (S27). The second period $T2_n$ is longer than the second period $T2_{n-1}$ for recording the (n−1)th recording column. The determination in S27 is repeated until the second period $T2_n$ is determined as to be elapsed. When the second period $T2_n$ is determined as to be elapsed (S27: YES), formation of the dummy recording portion is ended and formation of the n-th recording column is ended (S28).

As described, in the present embodiment, a dummy recording portion is formed when the recording end position of the user-recorded information in the recording column is at upstream, relative to the recording direction, of the recording end position of the immediately previously formed recording column. Therefore, the recording end position of the recording column is controllable, irrespective of the data volume of the user-recorded information forming the recording column. Note that, when the magnetic recording reproducing apparatus 4 of the present embodiment is an apparatus which performs defrag (an operation of rearranging fragmented pieces of information in the magnetic recording medium 3 to cancel the fragmented status of information, thus increasing continuous area available), defrag is preferably performed so that the dummy recording portion be made smaller as much as possible. This enlarges the recordable area.

Fifth Embodiment

Next, the following describes a fifth embodiment of the present invention. Note that members and parts that are identical to those in the first embodiment, and no further details for them are provided below.

Figure 13:
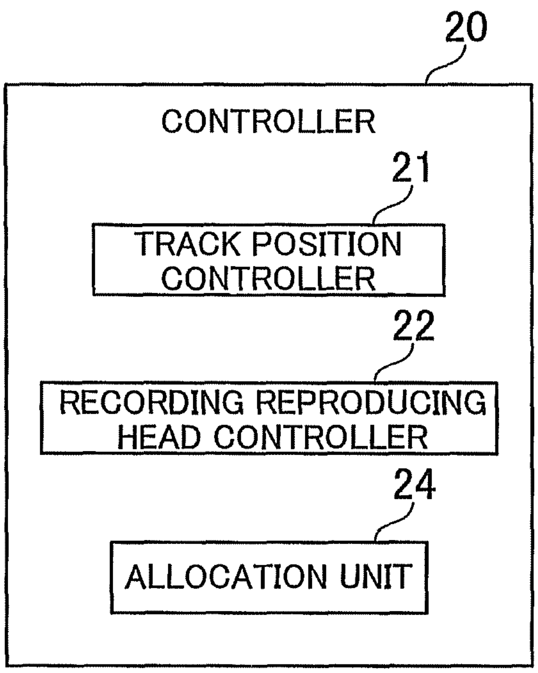
FIG. 13 is a block diagram showing a structure of the controller in the magnetic recording reproducing apparatus related to the Fifth Embodiment of the present invention.

As shown in FIG. 13, in the present embodiment, the controller 20 includes an allocation unit 24 in addition to the track position controller 21 and the recording head controller 22. The allocation unit 24, when forming a recording column on the magnetic recording medium 3, allocates data to be recorded in the recording column so that the length of the recording column is longer than an adjacent recording column having been formed immediately previously. The following describes the control by the allocation unit 24, supposing that all the recording columns are formed at an equal angular rate and an equal clock frequency.

As described, when all the recording column are formed at an equal angular rate and an equal clock frequency, the length of each recording column relative to the circumferential direction is proportional to the volume of data to be recorded in the recording column. In view of this, the allocation unit 24, when forming a recording column, allocates data so that the volume of data recorded in the recording column is larger than the volume of data recorded in an adjacent recording column having been formed immediately previously.

As described, the present embodiment includes an allocation unit 24 which, at the time of forming a recording column, allocates data to be recorded in the recording column so that the length of the recording column is longer than an adjacent recording column having been formed immediately previously. Therefore, as in the first embodiment, the recording start portion and the recording end portion of the recording column do not overlap the recording column having been formed immediately previously.

Sixth Embodiment

Next, the following describes a sixth embodiment of the present invention. Note that members and parts that are identical to those in the first embodiment, and no further details for them are provided below.

Figure 14:
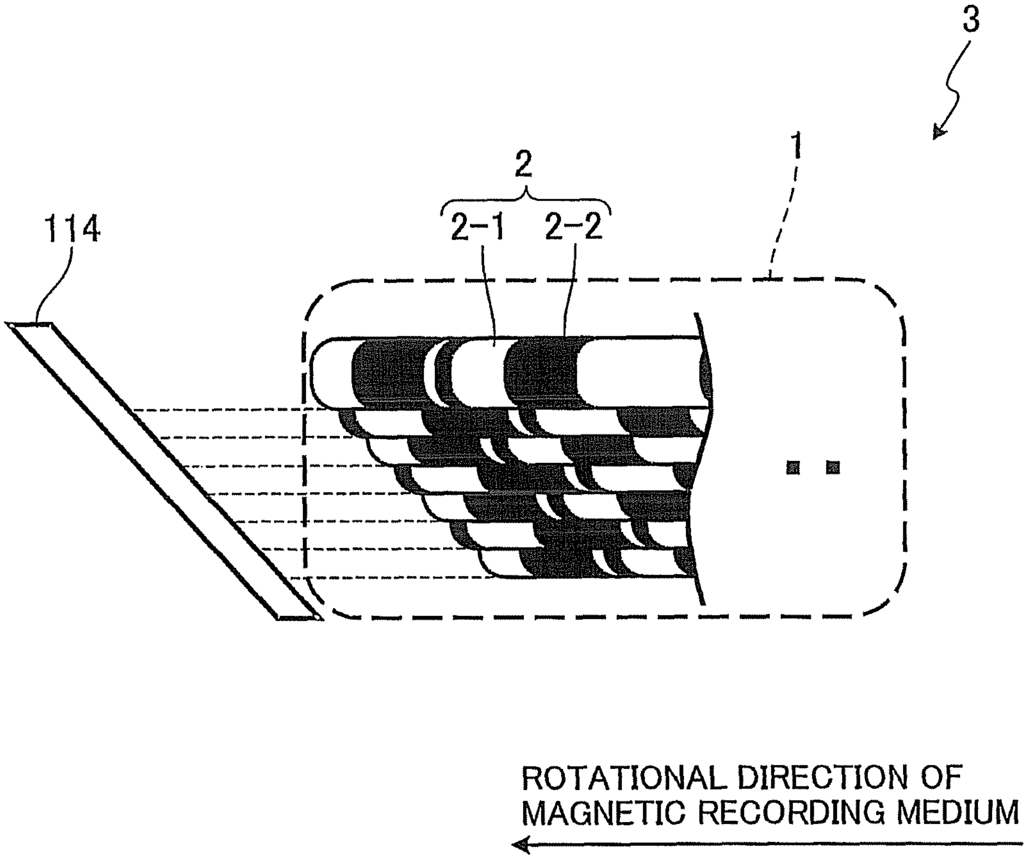
FIG. 14 shows a burst pattern formed on the magnetic recording medium of the first embodiment in the present invention.
Figure 15:
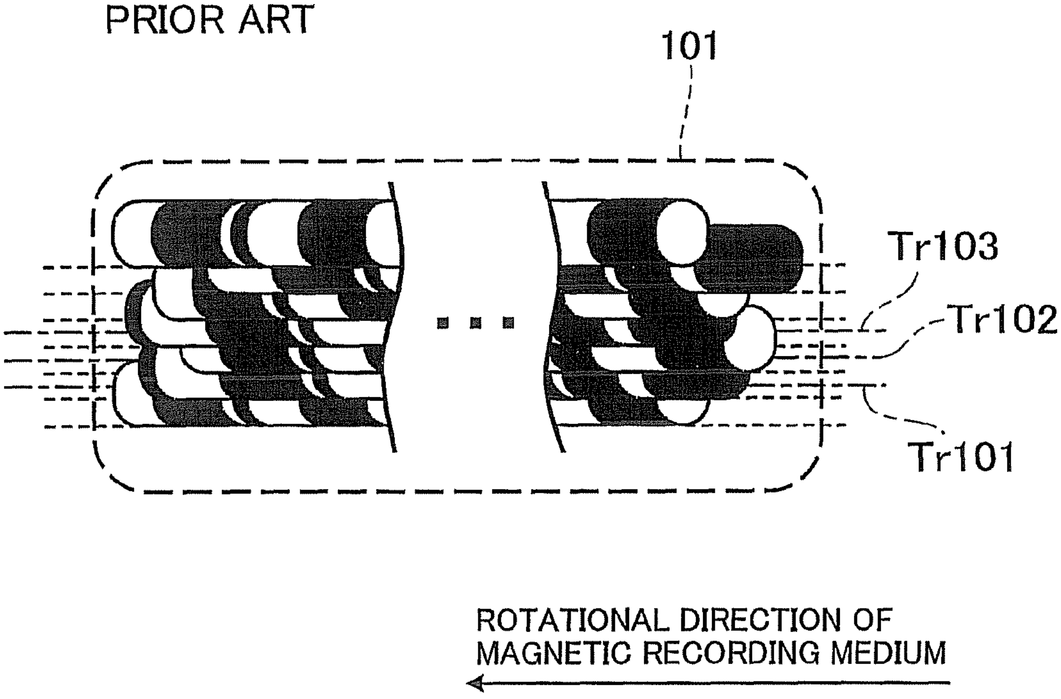
FIG. 15 schematically shows a plurality of recording columns formed on a traditional existing magnetic recording medium.
Figure 16A:
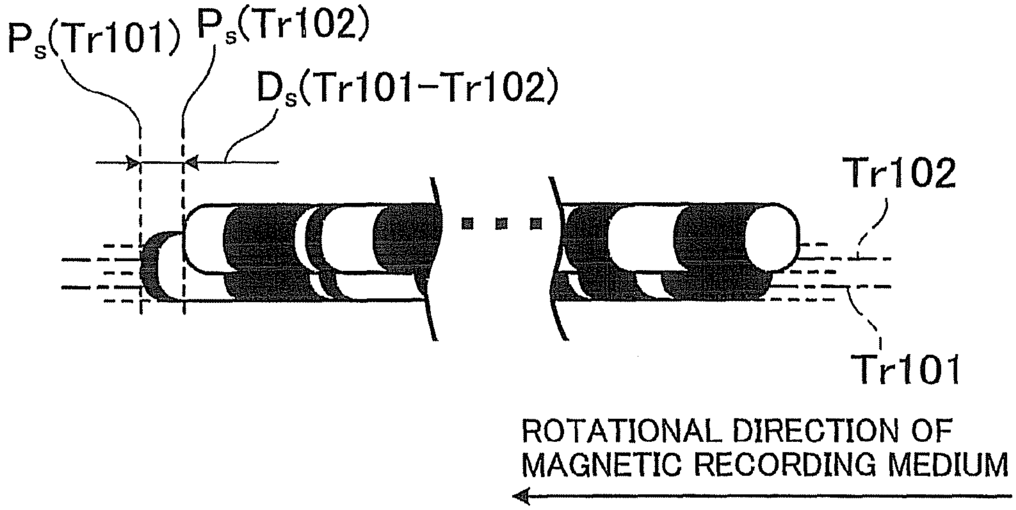
FIG. 16A shows a magnetization status immediately after the recording column for forming the track Tr102 of FIG. 15 is recorded.
Figure 16B:
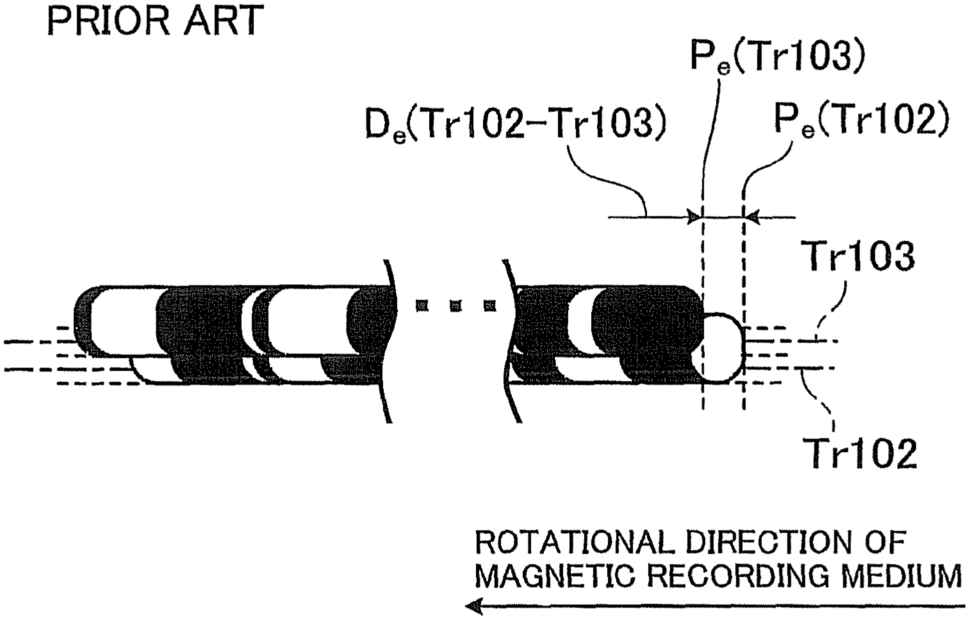
FIG. 16B shows a magnetization status immediately after the recording column for forming the track Tr103 of FIG. 15 is recorded.
Figure 17:
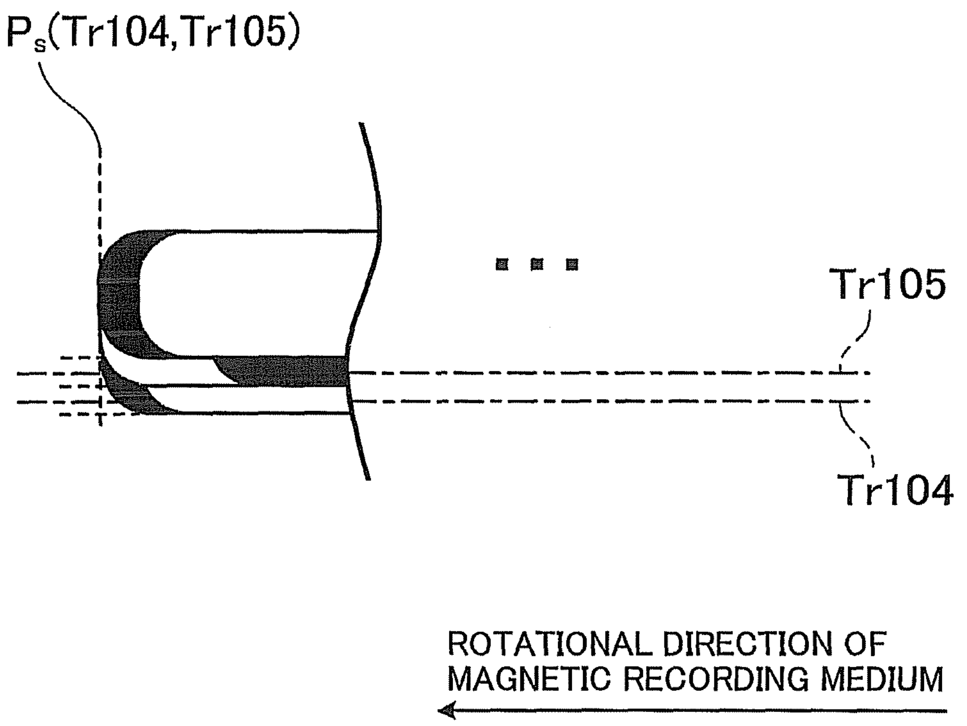
FIG. 17 provides an enlarged view of recording start portions of a plurality of recording columns formed on the traditional magnetic recording medium.

As shown in FIG. 14, in the present embodiment, a burst pattern 114 including recording start trigger information for a plurality of recording columns to be formed on a magnetic recording medium 3, which is tilted in towards upstream, relative to the recording direction (direction from the left to right in the figure), from one side of the magnetic recording medium 3 in a radial direction (lower side of the figure in the present embodiment) to the other side (upper side of the figure, in the present embodiment). In other words, in the present embodiment, the trigger information for a recording column whose recording start position is upstream, relative to the recording direction, of that of another recording column is positioned upstream of the trigger information for the other recording column.

Therefore, when a plurality of recording columns are formed at an equal angular rate on the magnetic recording medium 3 included in the magnetic recording reproducing apparatus 4 of the present embodiment, the recording start position of a recording column is positioned upstream, relative to the recording direction, of the recording start position of the recording column having been formed immediately previously, by giving a constant time interval from the reproduction of the burst pattern 114 for all of the recording columns. This simplifies the program related to recording and an operation of the magnetic recording element 10.

The following describes other modifications of the present invention. The above embodiments deal with a case where the recording columns are successively formed from one side of the magnetic recording medium 3 to another side, relative to a radial direction. The formation of recording columns is not limited to this. That is, for example, from a single recording column as the center line, recording columns may be successively formed on both sides of the center line, outwardly relative to the radial directions of the magnetic recording medium 3.

Further, the first embodiment described above deal with a case where all the recording columns are formed at an equal angular rate, and where the first period $T1_n$ which is a period from the point of reproducing the burst pattern 14 to formation of a record column is made shorter when forming the n-th recording column, as compared with the first period $T1_n$ at the time of forming the immediately previously formed (n−1)th recording column, thus positioning the recording start position of the n-th recording column upstream, relative to the recording direction, of the recording start position of the (n−1)th recording column. The present invention however is not limited to this. For example, when the n-th recording column is formed at a linear velocity of v1 and the (n−1)th recording column is formed at a linear velocity of v2, the result of $v1 \times T1_n$ is made smaller than that of $v2 \times T1_{n-1}$ so that the recording start position of the n-th recording column is positioned upstream of the recording start position of the (n−1)th recording column, relative to the recording direction. Further, the recording start position of the recording column may be also controlled by suitably adjusting a period between detection of an index signal obtained from the rotating spindle 6 (usually 1 signal/rotation) and the start of recording on the magnetic recording element 10. The same goes for control of the recording end position of the recording column.

The second embodiment described above deals with a case where the controller 20 performs control so that the differential $D_S$ between recording start positions of adjacent recording columns, relative to the circumferential direction of the magnetic recording medium 3 is $D_S > r_s$ and that the differential $D_e$ between recording end positions relative to the circumferential direction of the magnetic recording medium 3 is $D_e > r_e$. The present invention however is not limited to this. The controller may perform control so that only one of $D_s$ and $D_e$ satisfies the above inequality.

Further, the second embodiment described above deals with a case where the test writing unit 23 determines an optimal differential $D_s$ between recording start positions of two recording columns and an optimal differential $D_e$ between recording end positions of two recording columns. However, the test writing unit 23 may determine only one of the differential $D_s$ between recording start positions and differential $D_s$ between recording end positions.

The third embodiment deals with a case where the test writing unit 23 makes the polarity different between recording start positions of two recording columns which are formed through test writing for determining the differential $D_s$ between recording start positions of two recording columns; and makes the polarity different between recording end positions of two recording columns formed through test writing for determining the differential $D_e$ between recording end positions of two recording columns. The present invention however is not limited to this. The polarity may be made different either between the recording start positions or between the recording end positions. Further, the two recording columns may have the same polarity at their recording starting positions, and the same polarity at their recording end positions.

The fifth embodiment described above deals with a case where all the recording columns are formed at an equal angular rate and an equal clock frequency, and where the allocation unit 24 allocates data when forming recording columns so that the volume of data recorded in one recording column is greater than that of data recorded in the recording column having been subjected to immediately previous recording. The present invention however is not limited to this. Namely, where: all the recording columns are formed at an equal linear velocity and with an equal clock frequency; a volume of data to be recorded in a later formed recording column (radial position r1) is D1; a volume of data to be recorded in a previously formed recording column (radial position r2) is D2, the allocation unit 24 may allocate data so that the result of D1/r1 is greater than that of D2/r2.

The above embodiments deal with a case where a burst pattern 14 or 114, which is a magnetization pattern for performing tracking servo control to each track, is formed on the magnetic recording medium 3. However, the present invention is not limited to this. It is possible to form, in place of the burst pattern 14, a "servo mark pattern" for notifying the start of the servo mark, a "track data pattern" storing a track number, a "sector data pattern" storing a sector number, or the like. These patterns all serve as trigger information for triggering recording on the magnetic recording element 10.

Further, the above embodiments deal with a case where the controller 20 includes a track position controller 21 which controls the suspension 5 and the voice coil motor 7; and a recording head controller 22 which controls the recording reproducing head 9. The controller 20 however may further include, in addition to the track position controller 21 and the recording head controller 22, a rotation speed controller for controlling the rotation speed of the magnetic recording medium 3, by controlling the spindle 6 and a not-shown motor.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A magnetic recording reproducing apparatus, comprising:
a magnetic recording medium having an information recording area;
a magnetic recording element which records information by applying a recording magnetic field to the magnetic recording medium to form recording columns extending in a first direction;
a magnetic reproducing element which reproduces information by detecting a leaked magnetic field from the magnetic recording medium;
a moving mechanism which moves positions of the magnetic recording element and the magnetic reproducing element relative to the magnetic recording medium, in the first direction and a second direction perpendicular to the first direction; and
a controller which controls the magnetic recording element and the moving mechanism to form in the information recording area a plurality of recording columns adjacent to each other in the second direction so that each of the recording columns partially overlap with an adjacent recording column in the second direction,
wherein the controller controls the magnetic recording element and the moving mechanism so that a first recording column partially overlap with a previously formed second recording column in the second direction, and that a recording start position of the first recording column is positioned upstream, relative to a recording direction, of a recording start position of the second recording column.

2. The magnetic recording reproducing apparatus according to claim 1, wherein
the controller controls the magnetic recording element and the moving mechanism so that, of the plurality of recording columns successively formed in the second direction, each of the columns partially overlapping with an adjacent recording column relative to the second direction has its recording start position upstream, relative to the recording direction, of that of another recording column formed previously.

3. The magnetic recording reproducing apparatus according to claim 1, wherein:
each recording column formed by the magnetic recording element has a leading end portion which ranges from the recording start position to a length $r_s$ in the first direction, and which is narrowed towards the recording start position; and the controller controls the magnetic recording element and the moving mechanism so that a length of a differential $D_s$ between the recording start positions of the first recording column and the second recording column, relative to the first direction is such that $D_s > r_s$.

4. The magnetic recording reproducing apparatus according to claim 1, further comprising:
a test writer which repetitively perform a recording operation by the magnetic recording element, a reproducing operation by the magnetic reproducing element, and calculation of a quality index value obtained based on a reproduced signal output from the magnetic reproducing element, while varying the length of $D_s$ between the recording start positions of the first recording column and the second recording column relative to the first direction, thereby optimizing the $D_s$ to fulfill a predetermined condition related to the quality index value.

5. The magnetic recording reproducing apparatus according to claim 4, wherein:
the test writer forms the first recording column and the second recording column so that a magnetization polarity at the recording start position of the first recording column and a magnetization polarity at the recording start position of the second recording column are different from each other.

6. The magnetic recording reproducing apparatus according to claim 1, wherein:
the controller controls the magnetic recording element and the moving mechanism so that the recording end position of the first recording column is positioned downstream, relative to the recording direction, of a recording end position of the second recording column.

7. The magnetic recording reproducing apparatus according to claim 1, wherein:
the controller controls the magnetic recording element and the moving mechanism so that a recording start portion and a recording end portion of the first recording column do not overlap with the second recording column.

8. The magnetic recording reproducing apparatus according to claim 1, wherein
for each of the recording columns formed so that each recording column partially overlap with an adjacent recording column relative to the second direction, trigger information for the magnetic recording element to start recording is recorded upstream of the recording start position of each recording column so as to be reproducible by the magnetic reproducing element,
the trigger information for a recording column whose recording start position is upstream, relative to the recording direction, of that of another recording column is formed upstream of the trigger information for the other recording column.

9. A magnetic recording reproducing apparatus, comprising:
a magnetic recording medium having an information recording area;
a magnetic recording element which records information by applying a recording magnetic field to the magnetic recording medium to form recording columns extending in a first direction;
a magnetic reproducing element which reproduces information by detecting a leaked magnetic field from the magnetic recording medium;
a moving mechanism which moves positions of the magnetic recording element and the magnetic reproducing element relative to the magnetic recording medium, in the first direction and a second direction perpendicular to the first direction; and
a controller which controls the magnetic recording element and the moving mechanism to form in the information recording area a plurality of recording columns adjacent to each other in the second direction so that each of the recording columns partially overlap with an adjacent recording column in the second direction,
wherein the controller controls the magnetic recording element and the moving mechanism so that a first recording column partially overlap with a previously formed second recording column in the second direction, and that a recording end position of the first recording column is positioned downstream, relative to a recording direction, of a recording end position of the second recording column.

10. The magnetic recording reproducing apparatus according to claim 9, wherein:

the controller controls the magnetic recording element and the moving mechanism so that, of the plurality of recording columns successively formed in the second direction, each of the columns partially overlapping with an adjacent recording column relative to the second direction has its recording end position downstream, relative to the recording direction, of that of another recording column formed previously.

11. The magnetic recording reproducing apparatus according to claim 9, wherein:

each recording column formed by the magnetic recording element has a trailing end portion which ranges from the recording end position to a length $r_e$ in the first direction, and which is narrowed towards the recording end position; and the controller controls the magnetic recording element and the moving mechanism so that a length of a differential $D_e$ between the recording end positions of the first recording column and the second recording column, relative to the first direction is such that $D_e > r_e$.

12. The magnetic recording reproducing apparatus according to claim 9, wherein:

a test writer which repetitively perform a recording operation by the magnetic recording element, a reproducing operation by the magnetic reproducing element, and calculation of a quality index value obtained based on a reproduced signal output from the magnetic reproducing element, while varying the length of $D_e$ between the recording end positions of the first recording column and the second recording column relative to the first direction, thereby optimizing the $D_e$ to fulfill a predetermined condition related to the quality index value.

13. The magnetic recording reproducing apparatus according to claim 12, wherein:

the test writer forms the first recording column and the second recording column so that a magnetization polarity at the recording end position of the first recording column and a magnetization polarity at the recording end position of the second recording column are different from each other.

14. The magnetic recording reproducing apparatus according to claim 9, wherein:

the controller forms a dummy recording portion in the first recording column so that the recording end position of the first recording column is positioned at downstream, relative to the recording direction, of the recording end position of the second recording column.

15. A magnetic recording reproducing apparatus, comprising:

a magnetic recording medium having an information recording area;

a magnetic recording element which records information by applying a recording magnetic field to the magnetic recording medium to form recording columns extending in a first direction;

a magnetic reproducing element which reproduces information by detecting a leaked magnetic field from the magnetic recording medium;

a moving mechanism which moves positions of the magnetic recording element and the magnetic reproducing element relative to the magnetic recording medium, in the first direction and a second direction perpendicular to the first direction; and a controller which controls the magnetic recording element and the moving mechanism to form in the information recording area a plurality of recording columns adjacent to each other in the second direction so that each of the recording columns partially overlap with an adjacent recording column in the second direction, wherein the controller controls the magnetic recording element and the moving mechanism so that a first recording column partially overlap with a previously formed second recording column in the second direction, and that a recording start portion and a recording end portion of the first recording column do not overlap with the second recording column.

16. The magnetic recording reproducing apparatus according to claim 15, further comprising:

an allocator which allocates information to be recorded in the first recording column and information to be recorded in the second recording column, so that the first recording column is longer than the second recording column.

* * * * *